UNITED STATES PATENT OFFICE.

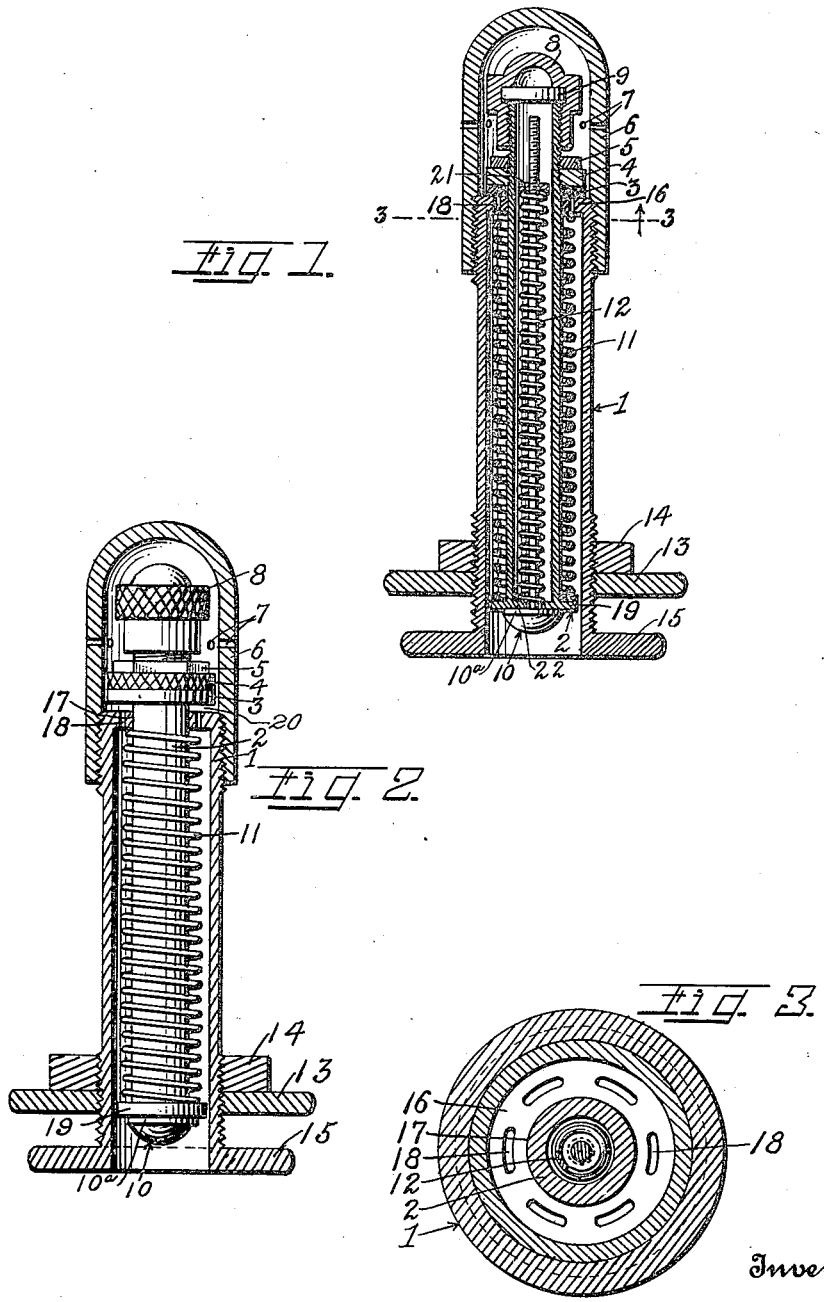

BENJAMIN BROWN, OF BRAHAM, MINNESOTA.

PRESSURE-RELIEF VALVE.

1,334,985.  Specification of Letters Patent.  Patented Mar. 30, 1920.

Application filed August 25, 1919. Serial No. 319,670.

*To all whom it may concern:*

Be it known that I, BENJAMIN BROWN, a citizen of the United States, residing at Braham, in the county of Isanti and State of Minnesota, have invented certain new and useful Improvements in Pressure - Relief Valves; and I do declare the following to be a full, clear, and exact description of the invention, such as will enable others skilled in the art to which it appertains to make and use the same.

This invention relates to pressure relief valves.

One object of this invention is to generally improve upon devices of this character by providing an improved structure which is exceedingly efficient, convenient, strong and durable, and consists of few and simple parts, so that it can be manufactured and maintained at slight cost.

Other objects and advantages may become apparent to persons who read the following details of description in connection with the accompanying drawings in which,—

Figure 1 is a central vertical sectional view illustrating the device with its inlet and outlet openings closed.

Fig. 2 is a sectional view illustrating the device with its outlet valve open, the floating or movable portions being shown in full elevation, while the casing and its external adjuncts are shown in vertical section.

Fig. 3 is an enlarged horizontal sectional view, the section being taken along the line 3—3 of Fig. 1.

Referring to these drawings in detail, in which similar reference characters correspond to similar parts throughout the several views,—

The device comprises an outer casing or integral member 1, a valve-tube or integral member 2, a disk 3 of rubber or other yielding impervious material, an adjusting nut 4, a locking nut 5, a closing cap 6 having air vents 7 therein, an inner closing cap 8 having a rubber disk therein, a closing member 10 for the inlet valve, a relatively strong helical spring 11, a relatively light or weak spring 12, a tire clamping plate or disk 13 and a locking nut 14.

The tubular body or casing 1 may be formed integrally of a single blank or disk of ductile metal by the process of metal drawing or forging, so that a tubular middle portion is formed having an outwardly extending tire-engaging flange 15 at one end and an inwardly extending bearing flange 16 at its other end, this flange serving three important functions, viz., that of a bearing for the tube 2 to slide in, a valve-seat for the valve-closing disk 3 to rest on, and a spring-seat against which the spring 11 presses for closing the outlet valve. The flange 15 coacts with the disk 13 and nut 14 for clamping a tire in the well known manner. The flange 16 provides a central circular bearing 17 in which the tubular valve member 12 is slidably seated. The flange 16 is provided with an annular series of air outlets 18 each of which is eccentric to the axis or longitudinal center of the cylindrical casing 1. The disk or valve closing member 3 is fitted around the tubular valve member 2 and normally seated on the flange 16 so as to close the outlets 18, the spring 11 being compressed between the flange 16 and an external flange 19 of the tubular member 2. It will be seen, therefore, that the outlet-closing member 3 is yieldably held by the coacting tube 2 and spring 11 in the outlet closing position. However, when the tire is pumped excessively, and when the internal pressure becomes excessive because of expansion, the resistance of the spring 11 is overcome, and the valve tube, together with the closing member 3 moves into the position shown in Fig. 2, thereby providing an opening as indicated at 20 so that air may pass out through the outlets 18 and into the cap 6, whence it may escape to the open air through the vents 7.

The closing member 10 comprises a rod having a head at one end, a screw thread at its other end and a disk 10ᵃ of rubber or other suitable material. A nut 21 is adjustably fitted on the screw threaded end of the member 10, and this nut provides a spring-seat against which one end of a spring 12 presses, the other end of the spring 12 pressing against an inwardly extending spring-seat or flange 22 of the tubular valve member 2. It will be seen that this spring 12 coacts with the valve member 10 to close the central aperture around which the spring-seat 22 extends, but yields when sufficient air pressure is applied when air is being forced or pumped into a tire through the valve tube 2.

Although I have described this embodiment of my invention very specifically, it is not intended to limit this invention to these exact details of construction and arrangement, but changes may be made within the scope of the inventive ideas as implied and claimed.

I claim as my invention.

1. In a pressure-relief valve, a casing formed integrally with a tire-engaging flange at one end and an inwardly extending bearing-flange at its other end, said bearing-flange having an air outlet therethrough, an inlet valve-tube slidable longitudinally in said bearing flange and provided with an internal spring-seat and an external spring seat, means carried by said inlet-valve-tube to close and open said air outlet of said bearing-flange; a spring seated on said external spring-seat and being effective to hold said means in the outlet-closing position, a valve member to close the said inlet valve-tube, and a spring seated on said internal spring-seat and being effective to hold said valve member in the position for closing said inlet valve tube.

2. In a pressure-relief-valve, a casing formed integrally with a tire-engaging flange and an internal bearing-flange, said bearing-flange having an air outlet therethrough, an inlet valve-tube slidable longitudinally in said bearing and provided with an internal spring-seat and an external spring-seat, a yielding impervious disk carried by said inlet-valve-tube to close and open said air outlet, a spring seated on said external spring-seat and being effective to hold said yielding impervious disk in the outlet-closing position, means on said inlet-valve-tube to adjust said disk on said tube and thereby regulate the tension of said spring, a valve member to close the said inlet-valve-tube, and a spring seated on said internal spring-seat and being effective to hold said valve member in the position for closing said inlet-valve-tube.

3. In a pressure-relief valve, an integral casing formed with an outwardly extending flange at one end and an inwardly extending annular flange at its other end, the inwardly extending flange forming a central bearing and having an eccentric air-outlet therethrough, an inlet-valve-tube slidable longitudinally in said bearing and provided with an external spring-seat, a disk fitted around and adjustable along said inlet-valve tube and normally seated on said inwardly extending flange and closing said air-outlet, and a helical compression spring surrounding said inlet-valve-tube and having one end pressing against said spring-seat while its other end presses against said inwardly extending flange, thereby holding said disk yieldably in its outlet-closing position.

In testimony whereof I have hereunto set my hand.

BENJAMIN BROWN.